United States Patent Office 3,390,199
Patented June 25, 1968

3,390,199
XYLENE ISOMERIZATION PROCESS
Robert L. Burnett, Pinole, Calif., assignor to Chevron Research Company, San Francisco, Calif., a corporation of Delaware
No Drawing. Filed Feb. 1, 1966, Ser. No. 523,854
5 Claims. (Cl. 260—668)

ABSTRACT OF THE DISCLOSURE

Xylene is isomerized to near o-m-p equilibrium at high space velocity in presence of $H_2$ over Ni on type Y sieve. Compared to other catalyst with feed 20% meta-xylene in 80% heptane, there was little isomerization of heptane nor substantial hydrocarbon cracking.

---

This invention relates to a method for isomerizing xylenes. More particularly, the present invention is concerned with a new and useful process for the selective production of a desired xylene from a mixture comprising xylene isomers having less than the equilibrium concentration of the desired isomer.

The xylenes, namely orthoxylene, metaxylene and paraxylene, are important chemicals and find wide and varied application in industry. Orthoxylene is a reactant for the production of phthalic anhydride. Metaxylene is used in manufacture of plasticizers, azo dyes, wood preservers, etc. Paraxylene upon oxidation yields terephthalic acid which is used in the manufacture of synthetic textile fibers.

As result of the important applications to which the individual xylene isomers are subjected, it is often very important to be able to produce high concentrations of a particular xylene. This can be accomplished by converting a nonequilibrium mixture of the xylene isomers, which mixture is low in the desired xylene isomer, to a mixture which approaches equilibrium concentrations. Various catalysts and processes have been devised to accomplish the isomerization process. For example, it is well known in the art that catalysts such as aluminum chloride, boron fluoride, liquid hydrofluoric acid, and mixtures of hydrofluoric acid and boron fluoride can be used to isomerize $C_8$ aromatic hydrocarbon mixtures to produce higher concentrations of a desired xylene. However the use of these catalysts generally involve long contact times, substantial amounts of disproportionation and low yields. Platinum or palladium on silica-alumina, and nickel sulfide on silica-alumina have been proposed as isomerization catalysts for xylene production. Generally, however, these catalysts involve high degrees of cracking of hydrocarbon components of the feed.

It is important to be able to isomerize at a high conversion rate a nonequilibrium mixture of the xylene isomers to obtain an equilibrium mixture. In this way, it is possbile to prcduce a high concentration of a desired xylene. For certain operations it is also important to be able to substantially limit the amount of cracking which occurs during the isomerization process. Cracking often results in the production of undesirable light gaseous hydrocarbons. If the petroleum feed to be isomerized contains valuable gasoline components in addition to xylene isomers, it is often wasteful to crack the gasoline components to lighter hydrocarbons. It would be valuable to have a process selective only for isomerization.

The xylene isomers, ortho-, meta-, and paraxylene, as well as ethylbenzene, tend to approach equilibrium composition when treated under isomerization conditions, the composition of the equilibrium mixture depending on the temperature. In an equilibrium mixture of $C_8$ aromatic hydrocarbons at 600° F., there exists 5% ethylbenzene, 21% orthoxylene, 51% metaxylene and 23% paraxylene. At 1000° F. the equilibrium distribution of the $C_8$ aromatic hydrocarbons is 11% ethylbenzene, 23% orthoxylene, 45% metaxylene, and 21% paraxylene. The rate of isomerization is normally quite slow. Also the rate of change in composition materially slows up as the equilibrium concentration is approached.

It is an object of this invention to provide a novel process for the production of a desired xylene isomer from a mixture comprising xylene isomers which mixture contains substantially less than the equilibrium content of the desired isomer. It is a further object of this invention to provide an isomerization process in which substantially no cracking of hydrocarbon components of the feed occurs. It is still a further object of this invention to provide a process for the isomerization of xylene mixtures at high rates of conversion, thereby decreasing the contact time of the xylenes with the catalyst used in the process.

It has been found that by use of the novel process of this invention that the rate of isomerization is dramatically increased such that high liquid hourly space velocities, that is, the volume of feed per volume of catalyst per hour, can be used in the isomerization process. This means that there need not be long contact times of the feed with the catalyst, thus increasing the rate of production. From this standpoint the present invention is economically important. It is an important feature of the present invention that substantially no cracking occurs during the isomerization process. This allows conversion of the nonequilibrium xylene fraction to equilibrium concentrations without the production of undesirable low hydrocarbons. Thus the present invention finds utility in a process wherein a feed containing nonequilibrium concentrations of xylene isomers, and being low in concentration of a desired xylene, which feed has a high octane rating for use as gasoline, is subjected to isomerization conditions to produce a substantially equilibrium mixture of xylenes. The desired xylene isomer is then recovered leaving a feed still possessing the desired high octane rating for use as gasoline.

The catalyst for use in the isomerization process of the present invention comprises a crystalline zeolitic aluminosilicate having intimately associated therewith a hydrogenating metal component consisting of a Group VIII iron transitional group metal or compound such as a sulfide or oxide of such metal. More particularly, the catalyst comprises a crystalline zeolitic aluminosilicate having intimately associated therewith cobalt or nickel in the elemental or compound form. The most preferred catalyst consists of a crystalline zeolitic aluminosilicate having intimately associated therewith a hydrogenating component consisting of nickel or nickel compounds. The metal content of the catalyst of this invention should preferably be within the range 0.5 to 5 weight percent. It is of course understood that mixtures of two or more metals or compounds may be intimately associated with the aluminosilicate.

Crystalline zeolitic aluminosilicates employed in the preparation of the catalyst encompassed by this invention comprise aluminosilicate cage structures in which alumina and silica tetrahedra are intimately connected with each other in an open three-dimensional crystalline network. Hydrogen or various metal cations are distributed throughout the structure. Natural or synthetic aluminosilicates may be used.

Various procedures are known for the preparation of synthetic crystalline zeolitic aluminosilicates. In general these methods involve the mixing and heating of a high silica/alumina ratio mixture of sodium silicate and sodium aluminate. The reagents are mixed under carefully controlled conditions to produce a crystalline product which may be subsequently ion-exchanged with a desired cation. Preferably the crystalline product is ion-exchanged with an ammonium salt to form a product comprising an ammonium aluminosilicate. Careful heat treatment of the ammonium form of the crystalline aluminosilicate to expel ammonia leaves the hydrogen form of the aluminosilicate. The hydrogen form is often referred to as a decationized aluminosilicate. Examples of operable crystalline zeolitic aluminosilicates and their methods of preparation are given in U.S. Patent 2,882,244, which describes Linde type X aluminosilicate, U.S. Patent 3,130,007, which describes Linde type Y aluminosilicate, and U.S. Patent 3,130,006 which describes the decationized type Y aluminosilicate.

Crystalline zeolitic aluminosilicates possess relatively well-defined pore structures. The present invention is not limited to any particular type of crystalline aluminosilicate or method of preparation as long as the pore structure comprise openings characterized by an effective pore diameter of between approximately 6 to 15 Angstroms. $C_8$ aromatic hydrocarbons are able to gain access to reactant sites of the catalyst when the pore dimensions are greater than 6 Angstroms. To obtain aluminosilicates of the necessary pore dimensions the silica to alumina molar ratio in the crystalline form should be greater than 2. A particularly preferred aluminosilicate for purposes of this invention is the Linde type Y aluminosilicate which possesses a silica to alumina molar ratio greater than 3.

The preparation of the catalyst for use in the isomerization process of this invention is not limited to any particular method. The metal component may be intimately associated with the crystalline zeolitic aluminosilicate either by ion exchange or by impregnation. Vapor phase adsorption of the metal component may also be employed to obtain a suitable catalyst. Incorporation of the desired metal into the aluminosilicate lattice may be accomplished at any particular stage of catalyst preparation. If ion exchange is the desired method, said exchange may be made with any ion which can be readily replaced by the cationic form of the hydrogenating metal. When the catalyst is to comprise a decationized zeolitic aluminosilicate, which is the preferred form of the aluminosilicate for purposes of this invention, the metal may be incorporated into the aluminosilicate lattice prior or subsequent to the decationization process.

After suitably associating the metal into the lattice of the crystalline aluminosilicate, the metal may be reduced by contact with a reducing atmosphere such as hydrogen. The reduced form of the metal may then be converted to an oxide or sulfide form by contact with an oxygen atmosphere or a sulfur-containing atmosphere, respectively. Sulfiding may preferentially be performed by contacting the catalyst containing the metallic hydrogenating component with a feed containing sulfur. Although the oxides and sulfides are the preferred compound forms of the metal hydrogenating component, any compound which performs as a hydrogenating component may be used in the catalyst for purposes of this invention.

The catalyst proposed for use in this invention may be mixed with support materials such as clays to obtain beneficial properties such as high attrition resistance and high compactability. The physical form of the catalyst will vary with the manipulative process to which it will be exposed. The catalyst may properly be used in a fixed bed, a moving bed, or in a fluidized bed. For the fixed bed and moving bed processes the catalyst may be in the form of beads, tablets or extruded pellets. If a fluidized bed is to be used, the catalyst must be in a powder form.

It is also encompassed in this invention that the catalyst may be admixed with conventional reforming catalysts to bring about better xylene isomerization without deleterious side effects. The catalyst components may be mixed either in macro size or micro size followed by co-pelleting.

The isomerization process is performed in a hydrogen atmosphere. Hydrogen may be added to the feed prior to contact with the catalyst but should be present during contact of the feed with the catalyst. Thus, the present invention may be properly referred to as a hydroisomerization process. Hydrogen to feed mole ratios from 1:1 to 15:1 are permissible. However, hydrogen to feed mole ratios from 3:1 to 10:1 are preferred for the purposes of this invention.

The pressures used in the isomerization process may range from about 50 to 1000 p.s.i.g., with the preferred pressure range being from about 200 to 600 p.s.i.g. Pressures below about 50 p.s.i.g. cause rapid fouling of the catalyst.

The temperature range employed in the isomerization process may range from about 600° F to 1100° F. The preferred temperature range is from 800° F. to 100° F.

Suitable feeds comprising large volumes of xylene isomers are obtained by conventional processes such as the catalytic reforming of petroleum naphthas. The reforming process generally involves a number of simultaneously occuring reactions such as cracking, aromatization, dehydrocyclization and dehydrogenation of naphthenes. Fractional distillation of the reformate can accomplish the separation of a $C_8$ aromatic hydrocarbon fraction which contains ethylbenzene in addition to orthoxylene, metaxylene and paraxylene. The $C_8$ aromatic hydrocarbon fraction thus obtained does not necessarily consist of an equilibrium concentration of the different isomers, but rather, may be low in one or more of the xylenes.

The feed comprising xylene isomers which may be used in the isomerization process may consist solely of xylene isomers having less than the equilibrium concentration of one of the isomers, which isomer is the desired isomer, or the feed may consist solely of one xylene isomer. Furthermore, other hydrocarbon components such as paraffins, naphthenes or aromatics, may be present in the feed and usually the feed will contain such hydrocarbon components. For economics of operation the feed should contain no less than 5 percent by volume of xylenes.

By the process of the present invention it is possible to obtain nearly equilibrium concentrations of, for example, orthoxylene, from a nonequilibrium mixture of isomers of orthoxylene containing less than the equilibrium concentration of orthoxylene. Furthermore it is possible to obtain equilibrium concentrations of paraxylene and orthoxylene from a nonequilibrium mixture comprising less than equilibrium concentrations of ortho- and paraxylene. Paraxylene is very often more desirable than the other xylene isomers. Hence the present invention is particularly useful in the production of paraxylene from mixtures comprising xylene isomers, which mixture contains less than the equilibrium concentration of paraxylene, by contacting said mixture under isomerization conditions with a catalyst comprising a crystalline zeolitic aluminosilicate having intimately associated therewith a hydrogenating metal component consisting of an iron group transitional metal or compound to produce a substantially equilibrium concentration of the paraxylene. And by means of the present process such equilibrium mixture is obtained without loss of valuable hydrocarbons by cracking.

The invention finds significant value in the fact that the feed may be contacted with the isomerization catalyst at high space velocities. Thus, although the present process is applicable with low space velocities, it is a distinct advantage of the present process that the feed can be contacted with the catalyst at a liquid hourly space velocity between approximately 2 to 10 or preferably between approximately 4 to 8, to obtain substantially equilibrium concentrations of the desired isomer.

There are several methods available for the recovery of the desired xylene isomer. Paraxylene may be recovered from a mixture of xylene isomers and ethylbenzene by fractional crystallization. Metaxylene may be extracted with an HF—BF$_3$ mixture. Orthoxylene, metaxylene and ethylbenzene can be separated by efficient fractional distillation procedures. It is understood that for purposes of this invention that after contacting a suitable feed with the catalyst and recovering the desired isomer, the remaining mixture may be recycled through the isomerization conversion zone to obtain further yields of the desired isomer.

The process of the present invention may be more readily understood by reference to the following examples.

EXAMPLE 1

A synthetic crystalline zeolitic aluminosilicate containing nickel as the hydrogenating component was prepared as follows. A crystalline aluminosilicate containing substantially only ammonium as the exchangeable cation was calcined at 1000° F. for approximately two hours to expel ammonia to leave the decationized form of the aluminosilicate. After allowing to cool, the decationized aluminosilicate was contacted with an aqueous nickel nitrate solution for sufficient time to permit approximately 3.5% nickel in the cation form to be incorporated into the aluminosilicate lattice. The nickel containing aluminosilicate was then dried at approximately 250° F. and then calcined for approximately two hours at 1400° F.

EXAMPLE 2

The catalyst prepared by the procedure in Example 1 was tested for isomerization activity and compared with five other catalysts. Table I presents the results.

EXAMPLE 3

The catalysts A, B, C, and D as described in Examples 1 and 2 were compared with respect to cracking in an isomerization process under the same conditions and with the same composition feed as in Example 2. The moles of n-heptane and metaxylene cracked in 100 moles of feed at various times during contact of the feed stream with the above-mentioned catalysts were measured. Table II presents the data obtained.

TABLE II.—MOLES OF N-HEPTANE AND METAXYLENE CRACKED/100 MOLES FEED AFTER X HOURS ON-STREAM

| Hours on-stream | Catalysts | | | |
|---|---|---|---|---|
| | A | B | C | D |
| 2 | 3.5 | 23.7 | | 15.5 |
| 5 | 3.0 | 15.5 | 25.0 | 15.0 |
| 10 | 2.5 | 8.0 | 16.5 | 14.5 |
| 15 | 2.2 | 5.7 | 11.7 | 14.0 |
| 40 | 1.2 | | | |
| 88 | 1.0 | | | |

It is noted that using catalyst A in the process of this invention produced substantially no cracking at any time during the isomerization process. Catalysts B, C and D produced such high cracking during the initial portion of the isomerization process that feed was discontinued to these catalysts after 15 to 20 hours on-stream time. It is indeed unique that the process of this invention displays

TABLE I

| | Catalyst | | | | | | | | |
|---|---|---|---|---|---|---|---|---|---|
| | A | | | | B | C | D | E | F |
| Run | 1 | 2 | 3 | 4 | | | | | |
| Products (Moles in product/100 moles feed): | | | | | | | | | |
| n-heptane | 78.9 | 77.2 | 77.9 | 77.2 | 74.0 | 70.3 | 48.3 | 66.3 | 17.8 |
| i-heptane | 0.09 | 0.39 | 0.32 | 0.1 | 0.4 | 0.45 | 16.1 | 8.1 | 31.3 |
| C₈ aromatics | 18.5 | 18.3 | 18.6 | 19.8 | 18.8 | 15.4 | 18.9 | 20.2 | 19.8 |
| Toluene | 1.0 | 1.6 | 0.9 | 0.8 | 1.3 | 2.8 | 1.6 | 1.6 | 2.2 |
| Benzene | | 0.12 | 0.03 | 0 | 0.1 | 0.75 | | 0 | 0 |
| Total aromatics | 19.5 | 20.0 | 19.6 | 20.6 | 20.2 | 18.9 | 20.5 | 21.8 | 22.0 |
| Cracked Products | 1.49 | 2.18 | 2.1 | 1.9 | 5.4 | 11.0 | 13.8 | 2.2 | 27.2 |
| Percent Orthoxylene in C₈ isomers | 18.9 | 20.3 | 19.6 | 17.7 | 22.8 | 25.2 | 20.8 | 0.5 | 17.2 |
| Percent Paraxylene in C₈ isomers | | | | 21.0 | | | | | |

Catalyst A is the catalyst prepared by the procedure described in Example 1. Four separate runs were made with this type catalyst. Catalyst B is a decationized Linde type Y aluminosilicate having 0.5% palladium incorporated therein. Catalyst C is a decationized Linde type Y sieve having 3.5% nickel and 0.5% palladium intimately associated therewith. Catalyst D is a Linde Y sieve with calcium as the exchangeable ion having intimately associated therewith 0.5% platinum. Catalyst E is a commercially available alumina reforming catalyst containing platinum and halogen. Catalyst F is the same type catalyst as Catalyst E except that extra halogen has been incorporated onto the alumina support. The above catalysts were used in an isomerization process with the run time of 16 hours, a temperature of 900° F., a pressure of 250 p.s.i.g., a liquid hourly space velocity of 40, and a hydrogen to feed ratio of 6:1. The feed consisted of 80% normal heptane and 20% metaxylene. Table I illustrates that low cracking and selective isomerization of metaxylene of a specific embodiment of this invention. It is particularly noted that nearly equilibrium concentrations of orthoxylene and paraxylene were obtained, without substantial cracking, even though the feed was passed in contact with the catalyst at a liquid hourly space velocity of 40 or a liquid hourly space velocity of 8 for just the metaxylene isomer. The other catalysts, while many of them produced greater concentrations of orthoxylene, produced substantial cracking. Furthermore, several of the catalysts were not selective to the isomerization of xylene, but substantially isomerized n-heptane to isoheptane.

high selectivity towards the isomerization of xylenes while producing substantially no cracking of other components of the feed. Substantially no cracking results when less than about 10 molar percent cracking of the feed occurs during any particular time of the process.

I claim:

1. A method for the production of a desired xylene isomer from a mixture comprising xylene isomers having substantially less than the equilibrium content of the desired isomer, said desired xylene being selectively produced without substantial cracking, which comprises contacting said mixture under isomerization conditions including a temperature from about 600° F. to 1100° F. in the presence of hydrogen with a catalyst comprising a crystalline zeolitic aluminosilicate of the Y crystal type having intimately associated therewith a hydrogenating metal component consisting of an iron transitional group metal or compound thereof.

2. The method as defined in claim 1 wherein said crystalline zeolitic aluminosilicate is a decationized aluminosilicate of the Y crystal type.

3. The method as defined in claim 1 wherein said hydrogenating metal component consists of nickel and compounds of nickel.

4. The method as defined in claim 1 wherein the xylene isomers in said mixture are contacted with said catalyst at a liquid hourly space velocity of greater than 2.

5. The method as defined in claim 1 wherein said desired xylene is paraxylene and said mixture comprises at least one isomer of paraxylene and substantially less than the equilibrium content of paraxylene.

References Cited

UNITED STATES PATENTS

| | | | |
|---|---|---|---|
| 3,281,482 | 10/1966 | Dvoretzky et al. | 260—668 |
| 2,837,582 | 6/1958 | Hill et al. | 260—668 |
| 2,971,904 | 2/1961 | Gladrow et al. | 208—135 |
| 3,088,984 | 5/1963 | Oldenburg | 260—668 |
| 3,120,569 | 2/1964 | Egan | 260—668 |

DELBERT E. GANTZ, *Primary Examiner.*

G. E. SCHMITKONS, *Assistant Examiner.*